US010268951B2

(12) United States Patent
Sekiyama et al.

(10) Patent No.: US 10,268,951 B2
(45) Date of Patent: *Apr. 23, 2019

(54) REAL-TIME RESOURCE USAGE REDUCTION IN ARTIFICIAL NEURAL NETWORKS

(71) Applicant: International Business Machines Corporation, Armonk, NY (US)

(72) Inventors: Taro Sekiyama, Urayasu (JP); Kiyokuni Kawachiya, Yokohama (JP); Tung D. Le, Ichikawa (JP); Yasushi Negishi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/622,127

(22) Filed: Jun. 14, 2017

(65) Prior Publication Data

US 2018/0365558 A1 Dec. 20, 2018

(51) Int. Cl.
*G06N 3/08* (2006.01)
*G06N 3/04* (2006.01)

(52) U.S. Cl.
CPC .............. *G06N 3/08* (2013.01); *G06N 3/04* (2013.01)

(58) Field of Classification Search
None
See application file for complete search history.

(56) References Cited

U.S. PATENT DOCUMENTS

| 8,965,819 | B2 | 2/2015 | Tirunagari |
| 9,336,483 | B1 | 5/2016 | Abeysooriya et al. |
| 2016/0062947 | A1 | 3/2016 | Chetlur et al. |
| 2016/0162402 | A1 | 6/2016 | Woolley, Jr. et al. |
| 2016/0342888 | A1 | 11/2016 | Yang et al. |
| 2016/0358070 | A1* | 12/2016 | Brothers .............. G06N 3/0454 |
| 2017/0103319 | A1 | 4/2017 | Henry et al. |
| 2017/0161604 | A1* | 6/2017 | Craddock ............ G06N 3/0454 |
| 2018/0060759 | A1* | 3/2018 | Chu ..................... G06N 99/005 |
| 2018/0114114 | A1* | 4/2018 | Molchanov ............ G06N 3/084 |
| 2018/0137155 | A1* | 5/2018 | Majumdar ........ G06F 17/30587 |

FOREIGN PATENT DOCUMENTS

WO 2017038104 A1 3/2017

OTHER PUBLICATIONS

Sekiyama et al., "Real-Time Resource Usage Reduction in Artificial Neural Networks", U.S. Appl. No. 15/894,987, filed Feb. 13, 2018.
Accelerated Examination Support Document, U.S. Appl. No. 15/894,987, filed Feb. 12, 2018, 16 pgs.

(Continued)

*Primary Examiner* — Alan Chen
(74) *Attorney, Agent, or Firm* — Nolan M. Lawrence

(57) ABSTRACT

A generated algorithm used by a neural network is captured during execution of an iteration of the neural network. A candidate algorithm is identified based on the generated algorithm. A determination is made that the candidate algorithm utilizes less memory than the generated algorithm. Based on the determination the neural network is updated by replacing the generated algorithm with the candidate algorithm.

16 Claims, 4 Drawing Sheets

(56) References Cited

OTHER PUBLICATIONS

IBM, List of IBM Patents or Patent Applications Treated as Related, Feb. 12, 2018, 2 pages.

Li, C. "Optimizing Memory Efficiency for Many-Core Architecture", A dissertation submitted to the Graduate Faculty of North Carolina State University in partial fulfillment of the requirements for the degree of Doctor of Philosophy, Raleigh, North Carolina, 2016, 158 pages.

Li et al., "Optimizing Memory Efficiency for Deep Convolutional Neural Networks on GPUs", International Conference on High Performance Computing, Networking, Storage, and Analysis (SC'16), 2016, 12 pages.

Unknown, "Cudnn Library", NVIDIA, User Guide, DU-06702-001_v5.1, May 2016, 149 pages.

Unknown, "Introduction to Chainer" Chainer Tutorial, printed Jun. 6, 2017, 13 pages, © Copyright 2015, Preferred Networks, inc. and Preferred Infrastructure, inc.

\* cited by examiner

REAL-TIME RESOURCE USAGE REDUCTION IN ARTIFICIAL NEURAL NETWORKS

BACKGROUND

The present disclosure relates to artificial neural network performance improvements, and more specifically, to algorithm identification and replacement during artificial neural network operation.

Artificial neural networks may be used for medical purposes, such as detecting or suggesting features in a medical image. Artificial neural networks may be used for commercial purposes, such as processing natural language in a customer service area. Artificial neural networks may be used for leisure purposes, such as sorting and categorization of images that depict vacations and holidays. Artificial neural networks may provide solutions to computing problems that are difficult to solve with rule-based solutions.

SUMMARY

According to the present disclosure, disclosed herein are embodiments of a method and a computer program product for reducing resource usage of an artificial neural network. A generated algorithm used by a neural network is captured during execution of an iteration of the neural network. A candidate algorithm is identified based on the generated algorithm. It is determined that the candidate algorithm utilizes less memory than the generated algorithm. Based on the determination the neural network is updated. The update includes replacing the generated algorithm of the neural network with the candidate algorithm.

Also disclosed herein are embodiments of a system for reducing resource usage of an artificial neural network. A processor, in communication with a memory, captures a generated algorithm used by a neural network. The capturing is performed during execution of a first iteration of the neural network. A candidate algorithm is identified based on the generated algorithm. It is determined that the candidate algorithm utilizes less memory than the generated algorithm. Based on the determination the neural network is updated. The update includes replacing the generated algorithm of the neural network with the candidate algorithm.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
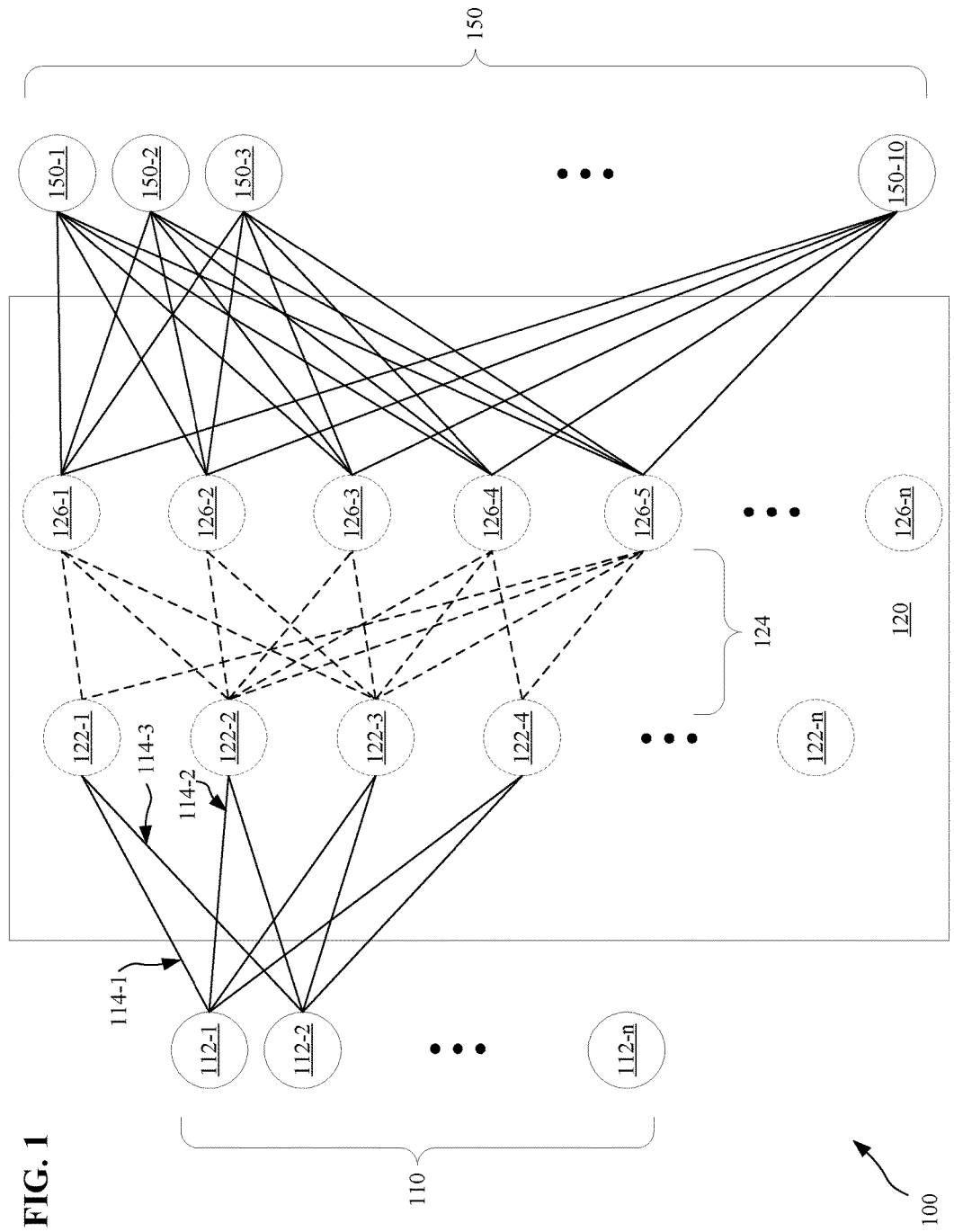
FIG. 1 depicts a model representative of one or more artificial neural networks capable of resource usage reductions consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to artificial neural network performance improvements, more particular aspects relate to algorithm identification and replacement during artificial neural network operation. While the present disclosure is not necessarily limited to such applications, various aspects of the disclosure may be appreciated through a discussion of various examples using this context.

Artificial neural networks (ANN) (alternatively, neural networks) are computation systems which may be utilized to solve various computer science problems. As ANNs solve problems differently from rule-based computing techniques, the understanding of how they operate is a constantly changing. As these changes occur, so do solutions for increasing ANN performance. Recent success in neural network designs and techniques along with variations in ANN creation have led to many new use cases. The proliferation of use cases for neural networks have seemingly coincided with the requirements for increased performance.

Early neural networks were designed to perform operations such as character recognition and as they improved these use cases were expanded. For example, earlier neural networks were designed to recognize and differentiate Arabic numerals (i.e., 0, 1, 2, 3, 4, 5, 6, 7, 8, and 9) from low resolution (e.g., 8 pixel by 8 pixel) black and white images. Later as the discipline matured, more complex character recognition responsibilities were given to neural networks. For example, high definition (e.g., 1920 pixel by 1280 pixel) color images may contain not only numbers but also letters. In some cases these character recognition neural networks may be tasked with identifying alphabets that contain hundreds or thousands of characters (e.g., there are more than ten thousand Chinese characters).

Other problems can be uniquely solved by neural networks as opposed to rule-based computing systems. Early image feature detection operations such as facial recognition could be hand-coded by programmers; equally capable neural networks could also be coded and trained to find the same subjects face in a series of still photographs taken from the same angle. In some cases more modern neural networks outperform hand-coded feature detection operations when asked to identify various subjects (e.g., both organic and inorganic subjects, subjects exhibiting various expressions, subjects in different environments, subjects in various lighting conditions, subjects from various angles, etc.). Likewise natural language processing neural networks have been honed by various programmers not just to perform simple subject identification or action classification. Modern natural language processing neural networks can even perform complex word rearrangement or grammar suggestions while preserving sentence and paragraph intent.

As these tasks have increased in complexity the computer science resource requirements have also increased. Neural networks, like many disciplines of computer science, may be bound by computer resources and not only programmer ingenuity. The computer resources that neural networks may depend on include processing resources and memory resources. Processing resources may include not only the speed of compute units or processing cores but also the functionality and number of available compute units. Memory resources may include the overall availability of memory as well as any hierarchy advantages or bandwidth efficiencies.

Neural networks may be defined as a collection or layout of neurons or nodes. Each of the neurons may be a processing unit design to perform a handful of finite calculations. Additionally each neuron may be connected to one or more of the other neurons by connections. The connections each contain further computational instructions for modification of the input or output of a given neuron. Basic neural networks may range from a few dozen to a couple hundred neurons. The aforementioned increase in both the use case variation as well as use-case complexity may result in neural networks that often contain thousands or millions of neurons and, consequently, thousands or millions of connections.

To perform the computational power that more advanced ANNs require, more extreme computer resources may be required. First, the processing power to perform the millions of calculations necessitate advanced computer processors. For example, an ANN may only function properly on a computer with a multiple core Central Processing Unit (CPU), or a computer with multiple CPUs. In some cases, the quantity of processing power may necessitate the use a Graphical Processing Unit (GPU). GPUs are conventionally designed to generate virtual environments and, consequently, GPU architectures include parallelized vertex and pixel shaders used to render and raster polygons that make up the virtual environments. This parallelized nature of GPUs has shown in some instances to provide some advantages to the burgeoning workloads of ANNs.

Second, the memory resources needed to perform the millions of calculations necessitate an ever-increasing amount of memory. Additionally, that memory may need to be high speed such as double data rate (DDR) memory or graphics DDR found coupled to GPUs. The tension between extremely parallel processing as provided by specialized processors and memory can be even more extreme when GPUs are taken into account. As GPUs are designed to work with texture assets while rendering virtual worlds, they may not be built or configured with an extensive amount of memory. The limited amount of memory makes finding a combination of processing and memory resources complex.

Additionally, there are further difficulties have come about with regards to programmer ingenuity. Many neural networks are considered define-and-run networks. That is, the network layout is defined before runtime, in some cases by a programmer. In some cases, before runtime means before any data is processed through the neural network. Recently, advances to ANNs have led to a new define-by-run network. Define-by-run networks differ in that the network layout itself is defined by the operation of running data through the network. Define-by-run networks allow for programmers to build more complex logic into and with ANNs (e.g., looping and conditional structures). While define-by-run networks allow for various ANN advantageous, they may have some downsides as well. Define-by-run networks by their very nature may prevent users from knowing the network layout until runtime. Further, even if the layout could be determined, a given input of data may change or alter the operation of the define-by-run network.

Some define-by-run network optimizations (DNOs) may alleviate the issues regarding define-by-run networks. DNOs may be one or more specific optimizations that alter the define-by-run network. DNOs may be performed during the operation (e.g., runtime) of the define-by-run network. DNOs may operate by replacing one or more algorithms of the neural network with optimized versions of the neural network algorithms. In some cases, DNOs may increase the performance of fully connected neural network algorithms. In some cases, DNOs may increase the performance of convolutional neural network algorithms. The terms optimize and optimization could include a perfectly optimized algorithm. The present disclosure, however, may or may not include the selection and/or use of a perfect optimized algorithm. The terms optimize and optimization in the present disclosure include selection and/or use of an algorithm that performs more efficiently than another algorithm.

FIG. 1 depicts a model 100 representative of one or more artificial neural networks capable of resource usage reductions consistent with embodiments of the present disclosure. The model neural network (neural network) 100 is made up of a plurality of layers. The neural network 100 includes an input layer 110, a hidden section 120, and an output layer 150. Though model 100 depicts a feed-forward neural network, it should be appreciated that other neural networks layouts may also be optimized such as a recurrent neural network layout (not depicted). In some embodiments, the neural network 100 may be a design-and-run neural network and the layout depicted by the model may be created by a computer programmer. In some embodiments, the neural network 100 may be a design-by-run neural network and the layout depicted by the model may be generated by the input of data and by the process of analyzing that data according to one or more defined heuristics. The model 100 may operate in a forward propagation by receiving an input and outputting a result of the input. The model 100 may adjust the values of various components of the neural network by a backward propagation (back propagation).

The input layer 110 includes a series input neurons 112-1, 112-2, up to 112-n (collectively, 112) and a series of input connections 114-1, 114-2, 114-3, 114-4, etc (collectively, 114). The input layer 110 represents the input from data that the neural network is supposed to analyze (e.g., a digitized picture). Each input neuron 112 may represent a subset of the input data. For example the neural network 100 is provided with a digitized image as input, and the digitized image is represented by a series of pixels. In this example, input neuron 112-1 may be the first pixel of the picture, input neuron 112-2 may be the second pixel of the picture, etc. The number of input neurons 112 may correspond to the size of the input. For example when the neural network is designed to analyze images that are 256 pixels by 256 pixels, the neural network 100 layout may include a series of 65,536 (i.e., 256*256) input neurons. The number of input neurons 112 may correspond to the type of input. For example when the input is a color image that is 256 pixels by 256 pixels, the neural network 100 layout may include a series of 196,608 input neurons (65,536 input neurons for the red values of each pixel, 65,536 input neurons for the green values of each pixel, and 65,536 input neurons for the blue values of each pixel). The type of input neurons 112 may correspond to the type of input. In a first example, the neural network 100 may be designed to analyze images that are black and white, and each of the input neurons may be a decimal value between 0.00001 and 1 representing the grayscale shades of the pixel (where 0.00001 represents a pixel that is completely white and where 1 represents a pixel that is completely black). In a second example, the neural network 100 may be designed to analyze images that are color, and each of the input neurons may be a three dimensional vector to represent the color values of a given pixel of the input images (where the first component of the vector is an red whole-number value between 0 and 255, the second component of the vector is an green whole-number value between 0 and 255, and the third component of the vector is an red whole-number value between 0 and 255).

The input connections 114 represents the output of the input neurons 112 to the hidden section 120. Each of the input connections 114 vary depending on the value of each input neuron 112 and based upon a plurality of weights (not depicted). For example the first input connection 114-1 has a value that is provided to the hidden section 120 based on the input neuron 112-1 and a first weight. Continuing the example, the second input connection 114-2 has a value that is provided to the hidden section 120 based on the input neuron 112-1 and a second weight. Further continuing the example, the third input connection 114-3 based on the input neuron 112-2 and a third weight, etc. Alternatively stated, the input connections 114-1 and 114-2 share the same output component of input neuron 112-1 and the input connections 114-3 and 144-4 share the same output component of input neuron 112-2; all four input connections 114-1, 114-2, 144-3, and 144-4 may have output components of four different weights. Though the neural network 100 may have different weightings for each connection 114, some embodiments may contemplate weights that are similar. In some embodiments, each of the values of the input neurons 112 and the connections 114 must necessarily be stored in memory.

The hidden section 120 includes one or more layers that receive inputs and produce outputs. The hidden section 120 includes a first hidden layer of calculation neurons 122-1, 122-2, 122-3, 122-4, up to 122-$n$ (collectively, 122); a second hidden layer of calculation neurons 126-1, 126-2, 126-3, 126-4, 126-5, up to 126-$n$ (collectively 126); and a series of hidden connections 124 coupling the first hidden layer and the second hidden layer. It should be appreciated that model 100 only depicts one of many neural networks capable of optimization by embodiments of the disclosure. Consequently, the hidden section 120 may be configured with more or fewer hidden layers (e.g., one hidden layer, seven hidden layers, twelve hidden layers, etc.)—two hidden layers are depicted for example purposes.

The first hidden layer 122 includes the calculation neurons 122-1, 122-2, 122-3, 122-4, up to 122-$n$. Each calculation neuron of the first hidden layer 122 may receive as input one or more of the connections 114. For example, calculation neuron 122-1 receives input connection 114-1 and input connection 114-2. Each calculation neuron of the first hidden layer 122 also provides an output. The output is represented by the dotted lines of hidden connections 124 flowing out of the first hidden layer 122. Each of the calculation neurons 122 performs an activation function during forward propagation. In some embodiments, the activation function may be a process of receiving several binary inputs, and calculating a single binary output (e.g., a perceptron). In some embodiments, the activation function may be a process of receiving several non-binary inputs (e.g., a number between 0 and 1, 0.671, etc.) and calculating a single non-binary output (e.g., a number between 0 and 1, a number between −0.5 and 0.5, etc.). Various functions may be performed to calculate the activation function (e.g., a sigmoid neurons or other logistic functions, tan h neurons, softplus functions, softmax functions, rectified linear units, etc.). In some embodiments, each of the calculation neurons 122 also contains a bias (not depicted). The bias may be used to decide the likelihood or valuation of a given activation function. In some embodiments, each of the values of the biases for each of the calculation neurons must necessarily be stored in memory.

An example of model 100 may include the use of a sigmoid neuron for the activation function of calculation neuron 122-1. An equation (Equation 1, stated below) may represent the activation function of calculation neuron 112-1 as f(neuron). The logic of calculation neuron 122-1 may be the summation of each of the input connections that feed into calculation neuron 122-1 (i.e., input connection 114-1 and input connection 114-3) which are represented in Equation 1 as j. For each j the weight w is multiplied by the value x of the given connected input neuron 112. The bias of the calculation neuron 122-1 is represented as b. Once each input connection j is summed the bias b is subtracted. Finalizing the operations of this example as follows: given a larger positive number results from the summation and bias in activation f(neuron), the output of calculation neuron 122-1 approaches approximately 1; given a larger negative number results from the summation and bias in activation f(neuron), the output of calculation neuron 122-1 approaches approximately 0; and given a number somewhere in between a larger positive number and a larger negative results from the summation and bias in activation f(neuron), the output varies slightly as the weights and biases vary slightly.

$$f(\text{neuron}) = \frac{1}{1 + \exp(-\sum_j w_j x_j - b)} \qquad \text{Equation 1}$$

The second hidden layer 126 includes the calculation neurons 126-1, 126-2, 126-3, 126-4, 126-5, up to 126-$n$. In some embodiments, the calculation neurons of the second hidden layer 126 may operate similarly to the calculation neurons first hidden layer 122. For example, the calculation neurons 126-1 to 126-$n$ may each operate with a similar activation function as the calculation neurons 122-1 to 122-$n$. In some embodiments, the calculation neurons of the second hidden layer 126 may operate differently to the calculation neurons of the first hidden layer 122. For example, the calculation neurons 126-1 to 126-$n$ may have a first activation function, and the calculation neurons 122-1 to 122-$n$ may have a second activation function.

Likewise the connectivity to, from, and between the various layers of the hidden section 120 may also vary. For example, the input connections 114 may be fully connected to the first hidden layer 122 and hidden connections 124 may be fully connected from the first hidden layer to the second hidden layer 126. In embodiments, fully connected may mean that each neuron of a given layer may be connected to all the neurons of a previous layer. In embodiments, fully connect may mean that each of neuron of a given layer may function completely independently and do not share any connections. In a second example, the input connections 114 may not be fully connected to the first hidden layer 122 and the hidden connections 124 may not be fully connected from the first hidden layer to the second hidden layer 126.

Also likewise the parameters to, from, and between the various layers of the hidden section 120 may also vary. In some embodiments, the parameters may include the weights and the biases. In some embodiments, there may be more or fewer parameters than the weights and biases. For example, the model 100 may be of a convolutional network. The convolutional neural network may include a sequence of heterogeneous layers (e.g., an input layer 110, a convolution layer 122, a pooling layer 126, and an output layer 150). In such a network, the input layer may hold the raw pixel data of an image in a 3-dimensional volume of width, height, and color. The convolutional layer of such a network may output from connections that are only local to the input layer to identify a feature in a small section of the image (e.g., an eyebrow from a face of a first subject in a picture depicting four subjects, a front fender of a vehicle in a picture depicting a truck, etc.). Given this example, the convolutional layer may include weights and biases, as well as, additional parameters (e.g., depth, stride, and padding). The pooling layers of such a network may take as input the output of the convolutional layers but perform a fixed function operation (e.g., an operation that does not take into account any weight or bias). Also given this example, the pooling layer may not contain any convolutional parameters and may also not contain any weights or biases (e.g., performing a down-sampling operation).

The output layer 150 includes a series of output neurons 150-1, 150-2, 150-3, up-to 150-$n$ (collectively, 150). The output layer 150 holds a result of the analyzation of the neural network 100. In some embodiments, the output layer 150 may be a categorization layer used to identify a feature of the input to the neural network 100. For example, the neural network 100 may be a classification network trained to identify Arabic numerals. In such an example, the neural network 100 may include ten output neurons 150 corresponding to which Arabic numeral the network has identified (e.g., output neuron 150-2 having a higher activation value than output neurons 150 may indicate the neural network determined an image contained the number '1'). In some embodiments, the output layer 150 may be a real-value target (e.g., trying to predict a result when an input is a previous set of results) and there may be only a singular output neuron (not depicted). The output layer 150 is fed from an output connection 152. The output connection 152 provides the activations from the hidden section 120. In some embodiments, the output connections 152 may include weights and the output neurons 150 may include biases.

Training the neural network depicted by the model 100 may include performing back propagation. Back propagation is different from forward propagation. Forward propagation may include feeding of data into the input neurons 110; performing the calculations of the connections 114, 124, 152; and performing the calculations of the calculation neurons 122 and 126. The forward propagation may also be the layout of a given neural network (e.g., recurrence, number of layers, number neurons in one or more layers, layers being fully connected or not to other layers, etc.). Back propagation may be determining an error of the parameters (e.g., the weights and the biases) in the neural network 100 by starting with the output neurons 150 and propagating the error backward through the various connections 152, 124, 114 and layers 126, 122, respectively.

Back propagation includes performing one or more algorithms based on one or more training data to reduce the difference between what a given neural network determines from an input and what the given neural network should determine from the input. The difference between a network determination and the correct determination may be called the objective function (alternatively, the cost function). When a given neural network is initially created and data is provided and calculated through a forward propagation the result or determination may be an incorrect determination. For example, neural network 100 may be a classification network; may be provided with a 128 pixel by 250 pixel image input that contains the number '3'; and may determine that the number is most likely '9' and is second most likely '2' and is third most likely '3' (and so on with the other Arabic numerals). Continuing the example, performing a back propagation may alter the values of the weights of connections 114, 124, and 152; and may alter the values of the biases of the first layer of calculation neurons 122, the second layer of calculation neurons 126, and the output neurons 150. Further continuing the example, the performance of the back propagation may yield a future result that is a more accurate classification of the same 128 pixel by 250 pixel image input that contains the number '3' (e.g., more closely ranking '9', '2', then '3' in order of most likely to least likely, ranking '9', then '3', then '2' in order of most likely to least likely, ranking '3' the most likely number, etc.).

Equation 2 provides an example of the objective function in the form of a quadratic cost function (e.g., mean squared error)—other functions may be selected and the mean squared error is selected for example purposes. In Equation 2, all of the weights w and biases b of an example network. The example network is provided a given number of training inputs n in a subset (or entirety) of training data that have input values x. The example network may yield output a from x and should yield a desired output y(x) from x. Back propagation or training of the example network should be a reduction or minimization of the objective function 'O(w,b)' via alteration of the set of weights and biases. Successful training of the example network should not only include the reduction of the difference between the example network's answer a and the correct answers y(x) for the input values x, but given new input values (e.g., from additional training data, from validation data, etc.).

$$O(w, b) \equiv \frac{1}{2n} \sum_{x} \|y(x) - a\|^2 \qquad \text{Equation 2}$$

Many options may be utilized for back propagation algorithms in both the objective function (e.g., mean squared error, cross-entropy cost function, etc.) and the reduction of the objective function (e.g., gradient descent, batch-based stochastic gradient descent, Hessian optimization, momentum-based gradient descent, etc.). Back propagation may include using a gradient descent algorithm (e.g., computing partial derivatives of an objective function in relation to the weights and biases for all of the training data). Back propagation may include determining a stochastic gradient descent (e.g., computing partial derivatives of a subset the training inputs in a subset or batch of training data). Additional parameters may be involved in the various back propagation algorithms (e.g., the learning rate for the gradient descent). Large alterations of the weights and biases through back propagation may lead to incorrect training (e.g., overfitting to the training data, reducing towards a local minimum, reducing excessively past a global minimum, etc.). Consequently, modification to objective functions with more parameters may be used to prevent incorrect training (e.g., utilizing objective functions that incorporate regularization to prevent overfitting). Also consequently, the alteration of the neural network 100 may be small in any given iteration. Back propagation algorithms may need to be repeated many iterations to perform accurate learning as a result of the necessitated smallness of any given iteration.

For example, neural network 100 may have untrained weights and biases, and back propagation may involve the stochastic gradient descent to train the network over a subset of training inputs (e.g., a batch of 10 training inputs from the entirety of the training inputs). Continuing the example, neural network 100 may continue to be trained with a second subset of training inputs (e.g., a second batch of 10 training input from the entirety other than the first batch), which can be repeated until all of the training inputs have been used to calculate the gradient descent (e.g., one epoch of training data). Stated alternatively, if there are 10,000 training images in total, and one iteration of training uses a batch size of 100 training inputs, 1,000 iterations would be needed to complete an epoch of the training data. Many epochs may be performed to continue training of a neural network. There may be many factors that determine the selection of the additional parameters (e.g., larger batch sizes may cause improper training, smaller batch sizes may take too many training iterations, larger batch sizes may not fit into memory, smaller batch sizes may not take advantage of discrete GPU hardware efficiently, too little training epochs may not yield a fully trained network, too many training epochs may yield overfitting in a trained network, etc.).

Figure 2:
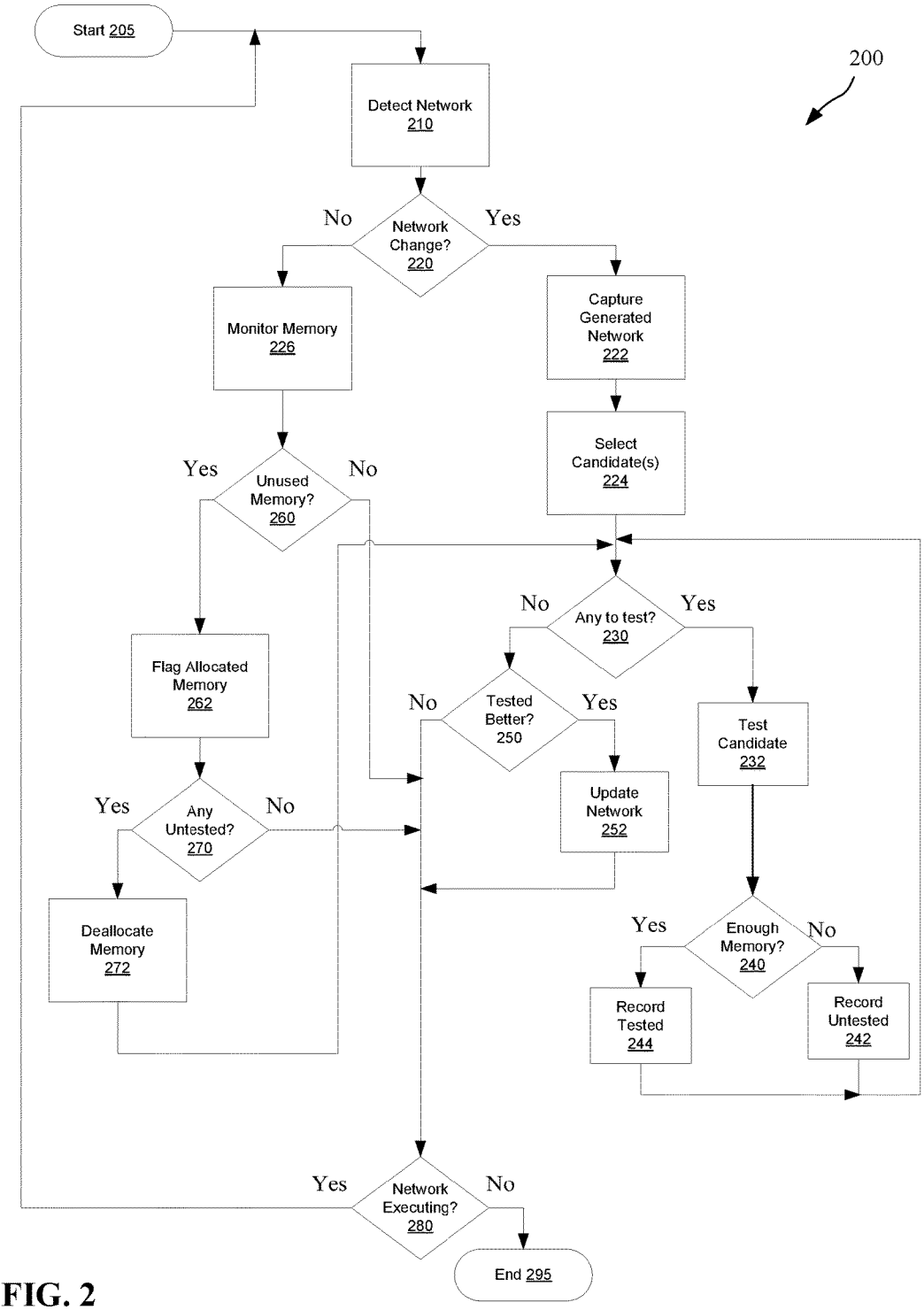
FIG. 2 depicts a flow diagram of a method for reducing memory utilization of an artificial neural network consistent with embodiments of the disclosure.
Figure 4:
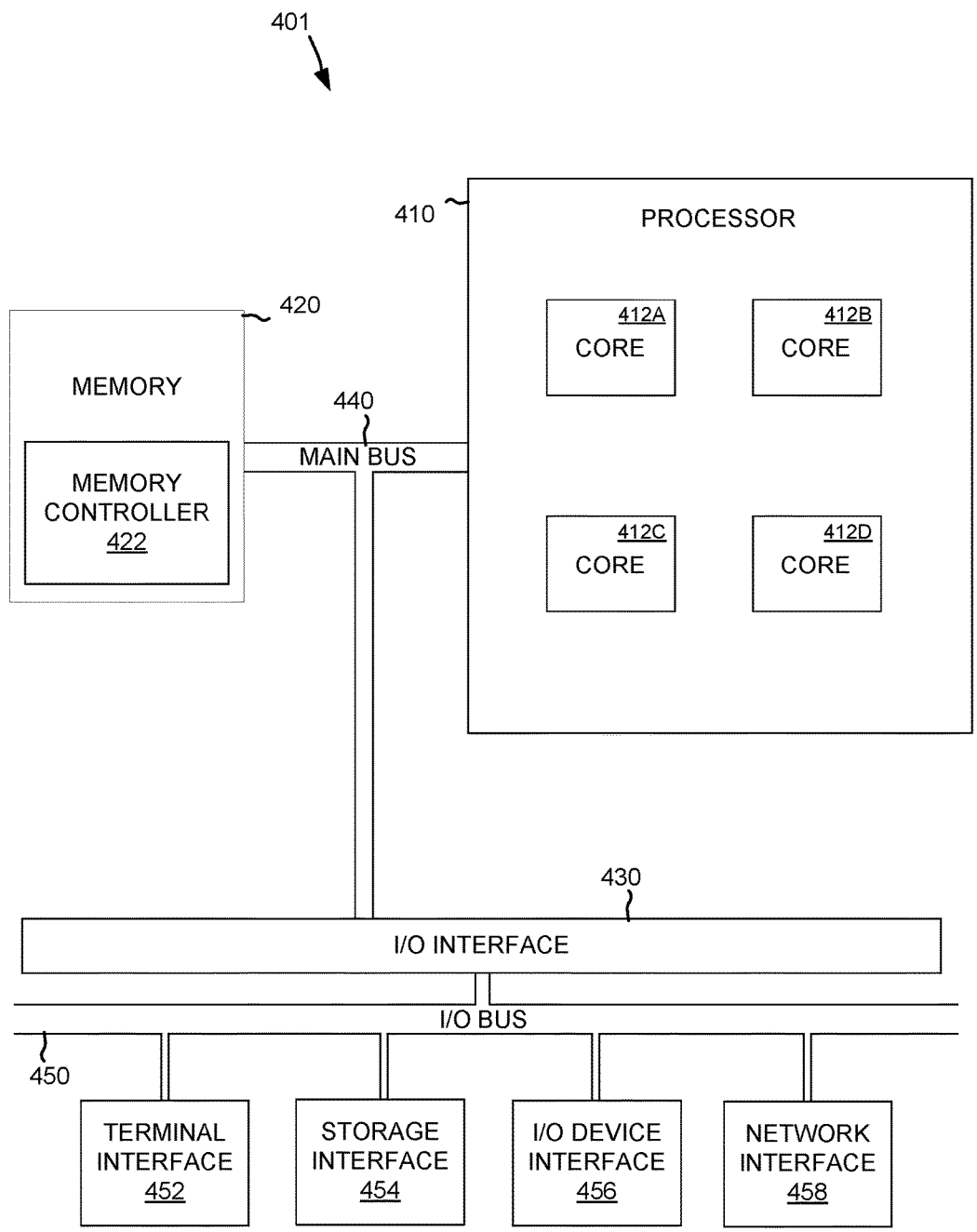
FIG. 4 depicts the representative major components of an exemplary computer system that may be used, in accordance with embodiments of the disclosure.

FIG. 2 depicts a flow diagram of a method 200 for reducing memory utilization of an artificial neural network consistent with embodiments of the disclosure. Method 200 may be executed by a processor or specialized processing unit of a computer system or a neural network processor. FIG. 4 depicts an example computer that may perform one or more steps of method 200. Method 200 may be executed by a processing unit not specifically adapted for processing neural networks, such as a graphics processing unit (GPU). In some embodiments, method 200 may be executed by a plurality of computing devices (e.g., a client computer provides request from a user to a server that provides enhanced memory bandwidth, reduced memory latency, preferred cache coherency, or enhanced drivers and firmware to execute the forward propagation and back propagation of the neural network). Method 200 may include more or fewer steps than those depicted, and certain steps may be performed in parallel though the flow diagram depicts serial steps. Method 200 may be executed many times rapidly (e.g., every sixteen milliseconds, every second, etc.).

Method 200 may be performed on an active neural network of many different layouts, such as the layouts contemplated by neural network model 100. Method 200 may form part of the control of the neural network and may provide responses to and receive memory requests to registers of a computer system memory or a GPUs graphics memory. Method 200 may solve how to receive and respond to these memory requests during operation of a neural network. Method 200 may operate despite not previously having any information regarding the layout or forward propagation of a given network. Though having no prior analysis of a given network may seem unconventional, this operation may also provide solutions for improved performance from neural network operation.

From start 205, a given neural network may be detected at 210. The neural network may be detected at 210 by scanning one or more memory spaces where a neural network is actively running. The neural network may be detected at 210 by accessing one or more active threads or processes and by a search for an active network (e.g., by a name search for activity matching the name of a neural network process, by a process id associated with the operation of a neural network, etc.). The neural network may be detected at 210 by detecting one or more calls from a main thread or process to a device or processor associated with operation of a neural network (e.g., a request to launch a neural network by a user command, an interrupt request to an operating system). In some embodiments, the neural network may be detected at 210 by initialization and launching of a neural network by method 200 or other methods that may be related to initialization of a new neural network. The neural network may be detected at 210 by a hypervisor or kernel that is operating on a computer system that is performing method 200.

Detection of the neural network at 210 may include the detection of a define-by-run operation of the neural network (e.g., a forward propagation operation that defines or redefines one or more layers or connections of a neural network). Detection of a define-by-run operation may occur during execution (e.g., forward propagation) of the network as inputs are provided by a supervising program and weights and biases are calculated. If a given neural network does change, at 220, then capturing the newly generated network may begin at 222. Capturing the generated network at 222 may occur by monitoring the output of the define-by-run operations (e.g., the numbers and results of the connections and the neurons of the generated network). Capturing the generated network at 222 may occur by monitoring the algorithms of the neural network generated by the define-by-run operations. The algorithms captured at 222 may include many various parameters (e.g., the weights of the connections, the level of connectivity, the biases of the neurons, the functions selected to perform the calculations of the neurons, whether one layer is fully connected to another). The algorithms captured at 222 may include not only the identification of a given algorithm but the type and value of parameters of the given algorithm (e.g., the stride parameter having value '3' of a convolutional layer of a neural network).

At 224 potential candidate algorithms that may replace the generated algorithms of the network may be selected. The potential candidate algorithms may be selected by category (e.g, convolutional neural network algorithms). The potential candidate algorithms may be selected by software solution (e.g., by library of available candidate algorithms provided by a hardware or software vendor of the computer that is executing the neural network). The potential candidate algorithms may be selected by parameters of the forward propagation (e.g., the weights, the biases, the type of neurons, the connectivity, etc.). The potential candidate algorithms may be selected by parameters of the backward propagation (e.g., the learning rate, the cost function, etc.). The potential candidate algorithms may perform operations in a different manner than those of the define-by-run network (e.g., the potential candidate algorithm may perform matrix math utilizing one or more advanced instructions of a CPU, by utilizing new higher precision data types of a CPU, by utilizing a 512-bit extensions of an enhanced instruction set of a CPU, by utilizing instructions that take advantage of a 7-stage pipeline, the potential candidate algorithm may perform a linear search through an optimized set of registers of a GPU, the potential candidate algorithm may perform a binary search utilizing calls through an advanced caching structure, the potential candidate algorithm may perform one or more math functions by utilizing one or more known microcode operations, etc.).

If there are any potential candidate algorithms that need to be tested, at 230, then one of the untested potential candidates will be tested at 232. The potential candidate algorithm may be tested at 232 by performing a forward propagation and a backward propagation utilizing the parameters and inputs of the active neural network. The results of the test at 232 may be recorded for comparison to the backward propagation being performed by the active neural network. In some embodiments, the testing of the candidate algorithm at 232 may include rerunning the active neural network and monitoring the generated algorithms that perform the forward propagation and backward propagation with the inputs as well as testing the candidate algorithms for the forward propagation and backward propagation. Testing the potential candidate algorithm at 232 may be performed with any memory that is not currently allocated to the neural network. In some embodiments, testing potential candidate algorithms at 232 may take more time than an iteration of the neural network and the neural network may begin a new iteration of operation before testing has completed. If testing a potential candidate algorithm has not been fully tested and a new iteration of the neural network begins, method 200 may also include a pausing operation of the neural network.

If there is not enough memory, at 240, to finish testing of a potential candidate, then the untested potential candidate may be recorded as untestable at 242. Recordation of potential candidate algorithm at 242 may include recordation of the generated algorithm of the neural network associated with the candidate algorithm. In some embodiments, if there is not enough memory for testing of a potential candidate algorithm at 240, method 200 may include pausing the neural network to free memory for testing the potential candidate. For example, a neural network may be active in memory in a graphics card and the neural network may be performing a forward propagation and a backward propagation on a third item of a set of training data. It may be determined that there is not enough memory, at 240, to finish testing a suitable replacement candidate at 232. The neural network (the connections, the weights and biases, and the neurons) as well as the state of the neural network (any calculated values as a result of the third item) may be suspended and saved into system memory. The neural network as well as the state of the neural network may be restored after the suitable replacement candidate has been tested.

If there is enough memory to finish testing a potential candidate algorithm, at 240, the results of the tested candidate algorithm may be recorded at 244. The recorded results of the tested candidate algorithm at 244 may include the recordation of the name of the algorithm. The recorded results of the tested algorithm at 244 may include the type of candidate algorithm that was tested. The recorded results of the tested algorithm at 244 may include the generated algorithm of the active neural network that is associated with the tested candidate algorithm. The recorded results of the tested algorithm at 244 may include the memory usage of the tested candidate algorithm. The recorded results of the tested algorithm at 244 may include the memory usage of the generated algorithm of the active neural network. In some embodiments, a potential candidate algorithm that may be tested at 232 may not be the only potential candidate algorithm, and recordation of the tested potential candidate algorithm 244 may include ranking the potential candidate algorithm against other tested potential candidate algorithms. The ranking of the tested candidate algorithms at 244 may include ranking the performance based on one or more factors (e.g., memory usage, processing cycles, type of network created, calls to secondary memory, etc.).

For example, a first potential candidate algorithm may be tested at 232. The test of the first potential candidate algorithm may indicate that the first potential candidate algorithm performs operations more efficiently than the define-by-run generated algorithm (e.g., using less memory, creating less neurons, performing more calculation in parallel). The results of the first potential candidate algorithm test may be recorded at 244. Next, a second potential candidate algorithm may be tested (again, at 232). The second potential candidate algorithm may perform better than the first potential candidate algorithm (e.g., using less memory than the first potential candidate algorithm, using similar memory to the first potential candidate algorithm using fewer processing cycles, etc.). The records regarding algorithm performance may be updated at 244 as indicated by Table 1.

TABLE 1

| Algorithm | Memory Usage | Processing Cycles | Rank | Replacement | Tested |
| --- | --- | --- | --- | --- | --- |
| Candidate I. | 2.1 GB | 10,500 | 2 | Algorithm A | True |
| Candidate II. | 1.9 GB | 11,000 | 1 | Algorithm A | True |
| Network-Generated Algorithm A. | 2.2 GB | 12,000 | 3 | N/A | True |
| Candidate III. | | | | Algorithm A | False |

After recordation of an algorithm as untested (at 242) or successfully tested (at 244), it may be determined if there are any additional candidate algorithms to test at 230. If another potential candidate algorithm is left for testing, at 230, the other potential candidate algorithm may be tested at 232. If no other potential candidate algorithm is left for testing, at 230, a determination may be made as to whether there are better tested candidate algorithms at 250. If any of the tested candidate algorithms perform operations of the neural network better than the generated algorithms, at 250, the neural network may be updated at 252. The neural network may be updated at 252 by replacing a single generated algorithm of the active neural network with the potential candidate algorithm (tested at 232). The neural network may be updated at 252 by replacing many generated algorithms with potential candidate algorithms. The neural network may be updated at 252 by searching through the records created at operation 244 to identify a better candidate. In embodiments where the testing of a potential candidate algorithm took long enough to pause the activity of the neural network, the neural network may be resumed after all candidates were tested at 244 or untested at 242 and after the neural network was updated with any better candidate algorithms at 252.

During detection of the network at 210 if the network does not change, at 220, then the memory usage of the active neural network may occur at 226. During monitoring of the neural network at 226 the neural network may request more memory (e.g., due to performing forward propagation for providing output on training data or validation data, due backward propagation for learning from the training data, etc.). During monitoring of the neural network at 226, method 200 may respond to memory requests and may allocate more memory to the neural network. During monitoring of the neural network at 226, other daemons or operating system processes may respond to memory requests. The neural network may begin to use less memory during monitoring at 226 (e.g., the neural network may use less memory as a result of using a candidate algorithm instead of a generated algorithm after a network update, which occurred at 252). If some or all of the memory allocated to the neural network becomes unused, at 260, the unused memory to the neural network may be flagged at 262. The allocated memory flagged at 262 may be utilized by future iterations of the neural network by the updated algorithm of the neural network. The allocated memory flagged at 262 may be utilized by future iterations of the neural network by other algorithms of the neural network. In some embodiments, the allocated memory flagged at 262 may be utilized by processes other than the neural network (e.g., diagnostic programs, rendering programs, kernel programs, etc.). If any of the recorded potential candidate algorithms were recorded as untested, at 270, the flagged memory may be deallocated from use by the neural network. After the flagged memory from the neural network is deallocated from the neural network at 272, the untested potential candidate algorithm may be tested at 232. If the network is still executing, at 280, then detecting operation of the network may continue at 210. If the network is no longer executing, at 280, then method 200 ends at 295.

Figure 3C:
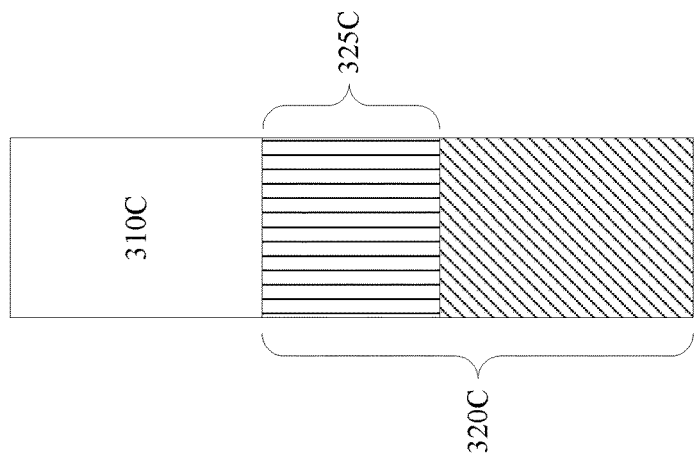
FIG. 3C depicts a memory space of a computer after performance optimization techniques consistent with embodiments of the disclosure.
Figure 3B:
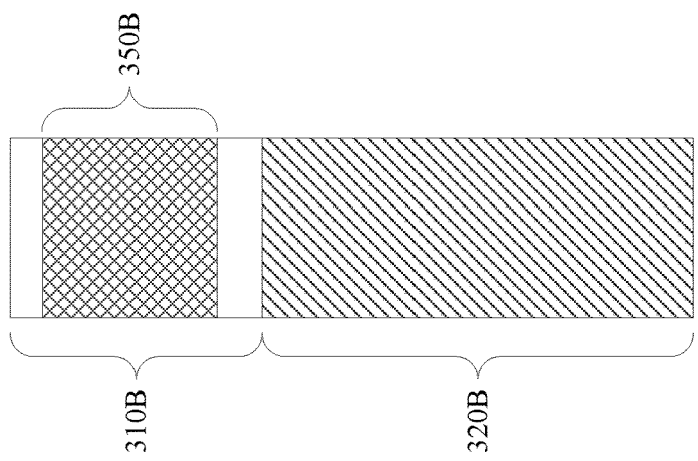
FIG. 3B depicts a memory space of a computer during performance optimization techniques consistent with embodiments of the disclosure.
Figure 3A:
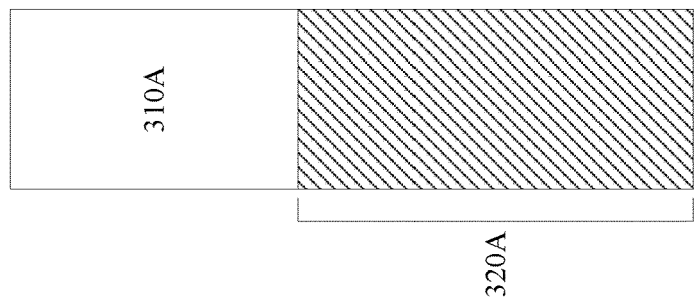
FIG. 3A depicts a memory space of a computer prior to performance optimization techniques consistent with embodiments of the disclosure.

FIG. 3A depicts a memory space of a computer prior to performance optimization techniques consistent with embodiments of the disclosure. In some embodiments, the active neural network may be a define-by-run neural network and the algorithms utilized may be generated by the neural network during forward propagation. The neural network may execute in a compute-specific operating environment being performed by a GPU and running in 8 gigabytes of graphics memory. During execution of the neural network at time period 300A the neural network may be in a third iteration of a training cycle and may be performing one or more forward propagation algorithms and one or more backward propagation algorithms on a third input to the neural network. During execution of the third iteration the neural network may utilized allocated memory 320A and unallocated memory 310A may be utilized by the GPU for additional tasks (e.g., running any other overrating environments, loading drivers, etc.). At time period 300A 5.5 gigabytes of allocated memory 320A may be in use by the neural network and 3.5 gigabytes of memory may be unallocated memory 310A.

FIG. 3B depicts a memory space of a computer during performance optimization techniques consistent with embodiments of the disclosure. Execution of the neural network discussed in FIG. 3A may continue to a fourth iteration during time period 300B. During the fourth iteration of the neural network may request more memory and 6 gigabytes of memory may be allocated memory 320B at time period 300B. During execution of the further iteration and while forward propagation of the neural network for the fourth input is executing, an optimization technique consistent with embodiments may begin execution. The optimization technique may be performed by selecting one or more candidate algorithms to compare against the active neural network. The optimization technique during time period 300B may include monitoring forward propagation of the neural network. The optimization technique during time period 300B may include monitoring backward propagation of the neural network. The optimization technique may utilize a subset 350B of unallocated memory 310B (e.g., 1.7 gigabytes of unallocated memory 310B may be used). The optimization technique may utilize significant memory for searching through potential candidate algorithms to test. The optimization technique may utilize significant memory for testing the potential candidate algorithms. In some embodiments, the optimization technique may utilize subset of memory 350B to execute a forward propagation and a backward propagation of a potential candidate algorithm and utilize the results to determine that replacement of forward propagation and backward propagation algorithm(s) of the active neural network are less optimal (e.g., the active algorithm utilized more memory than the potential candidate algorithm). In some embodiments, the optimization technique may utilize subset of memory 350B to execute both a forward and backward propagation of a potential candidate algorithm and a forward and backward propagation of an algorithm used in the active neural network.

FIG. 3C depicts a memory space of a computer after performance optimization techniques consistent with embodiments of the disclosure. FIG. 3C may depicted a time period 300C after the fourth iteration of the active neural network has finished and during execution of a fifth iteration of the active neural network. The active neural network may have been altered by a first candidate algorithm that was identified during time period 300B by the optimization technique. During time period 300C the optimization technique may no longer be active and the memory that is unallocated may be 310C. The allocated memory 320C may still be significant portion of the memory of the GPU (e.g., 6 gigabytes are allocated to the neural network 320C and 2 gigabytes are unallocated 310C). During time period 300C the fifth iteration of the neural network may experience less usage of allocated memory 320C. Unused memory 325C may be marked or flagged by the optimization technique. The flagged memory 325C may be utilized for future iterations of the neural network.

The flagged memory 325C of the allocated memory 320C may yield performance enhancements. The performance enhancements may be a result of reduced access requests. For example, the neural network may no longer needs to produce an access request from unallocated memory 310C to the GPU. The performance enhancements may be a result of reduced overhead. For example, the neural network may no longer need to wait on a response from the GPU each time the network needs to request an additional memory allocation, and no additional overhead is taken to find unallocated memory and allocate it to the neural network by the GPU. The performance enhancements may result from a first part of the neural network no longer starving another part of the neural network. For example, a first layer of the neural network may use less of the 8 gigabytes of memory and a second layer of the neural network may be able to utilize the unused memory 325C. In some embodiments, the performance of a future iteration (not depicted) may result in significant performance increases in define-by-run neural networks using the technique. Discovered performance may result in thirty-nine percent speed improvement in sixteen iterations compared to neural networks not utilizing techniques consistent with embodiments. Discovered performance may result in forty-seven percent speed improvement in sixty-four iterations compared to neural networks not utilizing techniques consistent with embodiments.

The flagged memory 325C of the allocated memory 320C may yield further performance optimization. For example, during time period 300B the optimization technique may have identified four potential candidate algorithms and the unallocated memory 310B may have only allowed for testing of a first candidate of the four potential candidate algorithms. The first candidate once implemented may yield savings of 2 gigabytes as indicated by unused memory 325C. In a future time period (not depicted) the GPU may have 4 gigabytes of unallocated memory that may be used to test the three potential candidate algorithms that were untested. One of the three potential candidate algorithms may be tested in a future time period utilizing the optimization techniques to determine that one of the three potential candidate algorithms is ideal for replacement, because it is more efficient than the first candidate algorithm.

FIG. 4 depicts the representative major components of an example computer system 401 that may be used, in accordance with embodiments of the present disclosure. It is appreciated that individual components may vary in complexity, number, type, and\or configuration. The particular examples disclosed are for example purposes only and are not necessarily the only such variations. The computer system 401 may comprise a processor 410, memory 420, an input/output interface (herein I/O or I/O interface) 430, and a main bus 440. The main bus 440 may provide communication pathways for the other components of the computer system 401. In some embodiments, the main bus 440 may connect to other components such as a specialized digital signal processor (not depicted).

The processor 410 of the computer system 401 may be comprised of one or more cores 412A, 412B, 412C, 412D (collectively 412). The processor 410 may additionally include one or more memory buffers or caches (not depicted) that provide temporary storage of instructions and data for the cores 412. The cores 412 may perform instructions on input provided from the caches or from the memory 420 and output the result to caches or the memory. The cores 412 may be comprised of one or more circuits configured to perform one or methods consistent with embodiments of the present disclosure. In some embodiments, the computer system 401 may contain multiple processors 410. In some embodiments, the computer system 401 may be a single processor 410 with a singular core 412.

The memory 420 of the computer system 401 may include a memory controller 422. In some embodiments, the memory 420 may comprise a random-access semiconductor memory, storage device, or storage medium (either volatile or non-volatile) for storing data and programs. In some embodiments, the memory may be in the form of modules (e.g., dual in-line memory modules). The memory controller 422 may communicate with the processor 410, facilitating storage and retrieval of information in the memory 420. The memory controller 422 may communicate with the I/O interface 430, facilitating storage and retrieval of input or output in the memory 420.

The I/O interface 430 may comprise an I/O bus 450, a terminal interface 452, a storage interface 454, an I/O device interface 456, and a network interface 458. The I/O interface 430 may connect the main bus 440 to the I/O bus 450. The I/O interface 430 may direct instructions and data from the processor 410 and memory 420 to the various interfaces of the I/O bus 450. The I/O interface 430 may also direct instructions and data from the various interfaces of the I/O bus 450 to the processor 410 and memory 420. The various interfaces may include the terminal interface 452, the storage interface 454, the I/O device interface 456, and the network interface 458. In some embodiments, the various interfaces may include a subset of the aforementioned interfaces (e.g., an embedded computer system in an industrial application may not include the terminal interface 452 and the storage interface 454).

Logic modules throughout the computer system 401—including but not limited to the memory 420, the processor 410, and the I/O interface 430—may communicate failures and changes to one or more components to a hypervisor or operating system (not depicted). The hypervisor or the operating system may allocate the various resources available in the computer system 401 and track the location of data in memory 420 and of processes assigned to various cores 412. In embodiments that combine or rearrange elements, aspects and capabilities of the logic modules may be combined or redistributed. These variations would be apparent to one skilled in the art.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
capturing, during execution of an iteration of a neural network, a generated algorithm used by the neural network during the iteration, wherein the execution of the iteration is a forward propagation and a backward propagation of the neural network;
identifying, based on the generated algorithm, a candidate algorithm;
recording, during execution of the iteration, the memory utilization of the generated algorithm;
performing, outside of the neural network, a forward propagation and a backward propagation with the candidate algorithm;
comparing the memory usage of the recorded generated algorithm and the performed candidate algorithm;
determining that the candidate algorithm utilizes less memory than the generated algorithm; and
updating, based on the determination, the neural network by replacing the generated algorithm of the neural network with the candidate algorithm.

2. The method of claim 1, further comprising:
detecting, before the determining, that the neural network has finished execution of the iteration;
pausing execution of the neural network; and
resuming, after the updating, the neural network.

3. The method of claim 1, wherein the neural network is a define-by-run neural network and wherein the identifying the generated algorithm is an identifying an updated layout of the neural network.

4. The method of claim 1, wherein the neural network is a convolutional neural network.

5. The method of claim 4, wherein the generated algorithm is a convolutional algorithm.

6. The method of claim 1, wherein the method further comprises:
monitoring usage memory allocated to the neural network after the replacement of the generated algorithm with the candidate algorithm; and
flagging, based on the monitoring the memory usage, a subset of the memory allocated to the neural network.

7. The method of claim 6, wherein the neural network comprises a second algorithm, wherein the method further comprises:
assigning the flagged subset of the memory allocated to the neural network to the second algorithm of the neural network.

8. The method of claim 6, wherein the method further comprises:
deallocating the flagged subset of memory.

9. A system comprising:
a memory; and a processor, the processor communicatively coupled to the memory, the processor configured to perform a method comprising:

capturing, during execution of an iteration of a neural network, a generated algorithm used by the neural network during the iteration, wherein the execution of the iteration is a forward propagation and a backward propagation of the neural network;

identifying, based on the generated algorithm, a candidate algorithm;

recording, during execution of the iteration, the memory utilization of the generated algorithm;

performing, outside of the neural network, a forward propagation and a backward propagation with the candidate algorithm;

comparing the memory usage of the recorded generated algorithm and the performed candidate algorithm;

determining that the candidate algorithm utilizes less memory than the generated algorithm; and updating, based on the determination, the neural network by replacing the generated algorithm of the neural network with the candidate algorithm.

10. The system of claim 9, wherein the method further comprises:

detecting, before the determining, that the neural network has finished execution of the iteration;

pausing execution of the neural network; and resuming, after the updating, the neural network.

11. The system of claim 9, wherein the neural network is a define-by-run neural network and wherein the identifying the generated algorithm is an identifying an updated layout of the neural network.

12. A computer program product comprising a computer readable storage medium having program instructions embodied therewith, the program instructions executable by a computer to perform a method comprising:

capturing, during execution of an iteration of a neural network, a generated algorithm used by the neural network during the iteration, wherein the execution of the iteration is a forward propagation and a backward propagation of the neural network;

identifying, based on the generated algorithm, a candidate algorithm;

recording, during execution of the iteration, the memory utilization of the generated algorithm;

performing, outside of the neural network, a forward propagation and a backward propagation with the candidate algorithm;

comparing the memory usage of the recorded generated algorithm and the performed candidate algorithm;

determining that the candidate algorithm utilizes less memory than the generated algorithm; and updating, based on the determination, the neural network by replacing the generated algorithm of the neural network with the candidate algorithm.

13. The computer program product of claim 12, wherein the method further comprises:

detecting, before the determining, that the neural network has finished execution of the iteration;

pausing execution of the neural network; and resuming, after the updating, the neural network.

14. The computer program product of claim 12, wherein the neural network is a convolutional neural network.

15. The computer program product of claim 14, wherein the generated algorithm is a convolutional algorithm.

16. The computer program product of claim 12, wherein the method further comprises:

monitoring usage memory allocated to the neural network after the replacement of the generated algorithm with the candidate algorithm; and flagging, based on the monitoring the memory usage, a subset of the memory allocated to the neural network.

\* \* \* \* \*